US011269665B1

(12) United States Patent
Podgorny et al.

(10) Patent No.: US 11,269,665 B1
(45) Date of Patent: Mar. 8, 2022

(54) METHOD AND SYSTEM FOR USER EXPERIENCE PERSONALIZATION IN DATA MANAGEMENT SYSTEMS USING MACHINE LEARNING

(71) Applicant: Intuit Inc., Mountain View, CA (US)

(72) Inventors: Igor A. Podgorny, San Diego, CA (US); Benjamin Indyk, San Diego, CA (US); Faraz Sharafi, San Diego, CA (US); Matthew Cannon, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 81 days.

(21) Appl. No.: 15/938,168

(22) Filed: Mar. 28, 2018

(51) Int. Cl.
*G06F 9/451* (2018.01)
*G06N 20/00* (2019.01)
*G06F 16/35* (2019.01)
*G06F 16/635* (2019.01)
*G06F 16/33* (2019.01)

(52) U.S. Cl.
CPC .......... *G06F 9/453* (2018.02); *G06F 16/3334* (2019.01); *G06F 16/3347* (2019.01); *G06F 16/35* (2019.01); *G06F 16/635* (2019.01); *G06N 20/00* (2019.01)

(58) Field of Classification Search
CPC ........ G06F 9/453; G06F 16/635; G06F 16/35; G06F 16/3334; G06F 16/3347; G06N 20/00
See application file for complete search history.

(56) References Cited

U.S. PATENT DOCUMENTS

| | | | |
|---|---|---|---|
| 5,471,382 A | 11/1995 | Tallman et al. | |
| 5,519,608 A | 5/1996 | Kupiec | |
| 5,701,399 A | 12/1997 | Lee et al. | |
| 6,006,218 A | 12/1999 | Breese et al. | |
| 6,147,975 A | 11/2000 | Bowman-Amuah | |
| 6,256,633 B1 * | 7/2001 | Dharap | G06F 16/9535 |
| 6,349,307 B1 * | 2/2002 | Chen | G06F 16/355 |
| 6,513,036 B2 | 1/2003 | Fruensgaard et al. | |
| 6,564,213 B1 | 5/2003 | Ortega et al. | |
| 6,601,055 B1 | 7/2003 | Roberts | |
| 6,708,172 B1 | 3/2004 | Wong et al. | |

(Continued)

FOREIGN PATENT DOCUMENTS

| | | |
|---|---|---|
| AU | 2001259223 B2 | 11/2001 |
| CN | 101520802 | 4/2009 |

(Continued)

OTHER PUBLICATIONS

Blei, David M., et al. "Latent Dirichlet Allocation;" Journal of Machine Learning Research 3, Jan. 2003, pp. 993-1022.

(Continued)

*Primary Examiner* — Alvin H Tan
(74) *Attorney, Agent, or Firm* — Paradice and Li LLP

(57) ABSTRACT

A method and system provides personalized assistance to users of a data management system. The method and system trains an analysis model with both a supervised machine learning process and an unsupervised machine learning process to identify relevant assistance topics based on a user query and the attributes of the user that provided the query. The method and system outputs personalized assistance to the user based on the analysis of the analysis model.

12 Claims, 4 Drawing Sheets

(56) References Cited

U.S. PATENT DOCUMENTS

| | | |
|---|---|---|
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,565,312 B1 | 7/2009 | Shaw et al. |
| 7,587,387 B2 | 9/2009 | Hogue |
| 7,594,176 B1 | 9/2009 | English |
| 7,603,301 B1 | 10/2009 | Regan |
| 7,610,226 B1 | 10/2009 | Miller |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,877,402 B1 | 1/2011 | Weiss et al. |
| 7,966,282 B2 * | 6/2011 | Pinckney ............... G06N 20/00 706/62 |
| 7,974,860 B1 | 7/2011 | Travis |
| 8,010,545 B2 | 8/2011 | Stefik et al. |
| 8,019,753 B2 | 9/2011 | Podgorny et al. |
| 8,185,517 B1 * | 5/2012 | Wood ................... G06Q 10/00 707/713 |
| 8,200,527 B1 | 6/2012 | Thompson et al. |
| 8,209,333 B2 | 6/2012 | Hubbard et al. |
| 8,271,471 B1 | 9/2012 | Kamvar et al. |
| 8,311,792 B1 | 11/2012 | Podgorny et al. |
| 8,311,863 B1 | 11/2012 | Kemp |
| 8,341,167 B1 | 12/2012 | Podgorny et al. |
| 8,473,339 B1 | 6/2013 | McKennon et al. |
| 8,478,780 B2 | 7/2013 | Cooper et al. |
| 8,484,228 B2 | 7/2013 | Bhattacharyya et al. |
| 8,631,006 B1 | 1/2014 | Haveliwala et al. |
| 8,645,298 B2 | 2/2014 | Hennig et al. |
| 8,660,849 B2 | 2/2014 | Gruber et al. |
| 8,732,222 B2 * | 5/2014 | Horvitz ................. G06N 5/043 707/899 |
| 8,805,734 B2 | 8/2014 | Diana et al. |
| 8,817,968 B1 | 8/2014 | Boutcher et al. |
| 8,850,490 B1 | 9/2014 | Thomas et al. |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,972,318 B2 * | 3/2015 | Prakash .............. G06F 16/9535 706/45 |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,229,974 B1 | 1/2016 | Lee et al. |
| 9,235,626 B2 | 1/2016 | Liu et al. |
| 9,247,066 B1 | 1/2016 | Stec et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,767,169 B1 | 9/2017 | Paff et al. |
| 9,779,388 B1 | 10/2017 | Hansen et al. |
| 9,881,102 B2 * | 1/2018 | Gordner ............ G06F 16/90324 |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,049,664 B1 | 8/2018 | Indyk et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 * | 2/2019 | Branavan ............. G06Q 30/016 |
| 10,354,182 B2 * | 7/2019 | Chang .................. G06N 3/0472 |
| 10,460,398 B1 | 10/2019 | Gielow et al. |
| 10,475,044 B1 | 11/2019 | Cannon et al. |
| 10,522,134 B1 | 12/2019 | Matsoukas |
| 10,552,843 B1 | 2/2020 | Podgorny et al. |
| 10,579,625 B2 | 3/2020 | Cho et al. |
| 10,748,157 B1 | 8/2020 | Indyk et al. |
| 10,755,294 B1 | 8/2020 | Podgorny et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0144873 A1 | 7/2003 | Keshel |
| 2004/0024739 A1 | 2/2004 | Copperman et al. |
| 2004/0034652 A1 | 2/2004 | Hofmann et al. |
| 2004/0064442 A1 | 4/2004 | Popovitch |
| 2005/0086290 A1 | 4/2005 | Joyce et al. |
| 2005/0114327 A1 | 5/2005 | Kumamoto et al. |
| 2005/0137939 A1 | 6/2005 | Calabria et al. |
| 2005/0222989 A1 | 10/2005 | Haveliwala et al. |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0143262 A1 | 6/2007 | Kasperski |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0214151 A1 | 9/2008 | Ramer et al. |
| 2008/0215541 A1 | 9/2008 | Li et al. |
| 2008/0248815 A1 | 10/2008 | Busch |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0089286 A1 | 4/2009 | Kumar et al. |
| 2009/0106224 A1 | 4/2009 | Roulland et al. |
| 2009/0119575 A1 | 5/2009 | Velusamy |
| 2009/0158143 A1 | 6/2009 | Arav |
| 2009/0162824 A1 | 6/2009 | Heck |
| 2009/0198667 A1 | 8/2009 | Groeneveld et al. |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1 | 3/2010 | Podgorny et al. |
| 2010/0082649 A1 | 4/2010 | Gutt et al. |
| 2010/0088262 A1 | 4/2010 | Visel et al. |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1 | 9/2010 | Craswell et al. |
| 2010/0235361 A1 | 9/2010 | Chandran et al. |
| 2010/0241507 A1 | 9/2010 | Quinn et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1 | 3/2011 | Li et al. |
| 2011/0071997 A1 | 3/2011 | Sullivan et al. |

(56) References Cited

U.S. PATENT DOCUMENTS

| | | |
|---|---|---|
| 2011/0106743 A1 | 5/2011 | Duchon |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0036053 A1 | 2/2012 | Miller |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0006914 A1 | 1/2013 | Ray et al. |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1 | 5/2013 | Pinckney et al. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0075004 A1 | 3/2014 | Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1* | 6/2014 | Stanke .................. G06F 9/453 |
| | | 715/708 |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0297268 A1 | 10/2014 | Govrin et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Salman et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0278241 A1 | 10/2015 | Bates-Haus et al. |
| 2015/0317197 A1 | 11/2015 | Blair |
| 2015/0317449 A1 | 11/2015 | Eder |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0188731 A1 | 6/2016 | Dai et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0259844 A1 | 9/2016 | Trapeznikov et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1 | 1/2017 | Maor et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0213130 A1 | 7/2017 | Khatri et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1* | 10/2017 | Zhu .................. G06F 16/9535 |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0121550 A1* | 5/2018 | Jeon .................. G06Q 50/01 |
| 2018/0137203 A1 | 5/2018 | Hennekey et al. |
| 2018/0174055 A1 | 6/2018 | Tirumale et al. |
| 2018/0189292 A1 | 7/2018 | Grace, Jr. et al. |
| 2018/0196796 A1 | 7/2018 | Wu |
| 2018/0204106 A1 | 7/2018 | Beller et al. |
| 2018/0287968 A1* | 10/2018 | Koukoumidis ....... G06F 16/248 |
| 2018/0321951 A1* | 11/2018 | Fitzgerald ............... G06F 3/167 |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |

(56) References Cited

U.S. PATENT DOCUMENTS

| | | |
|---|---|---|
| 2020/0027095 A1 | 1/2020 | Cannon et al. |
| 2020/0134635 A1 | 4/2020 | Podgorny et al. |
| 2020/0134738 A1 | 4/2020 | Goodyear et al. |
| 2020/0327622 A1 | 10/2020 | Podgorny et al. |
| 2020/0357009 A1 | 11/2020 | Podgorny et al. |

FOREIGN PATENT DOCUMENTS

| | | |
|---|---|---|
| EP | 2159715 | 3/2010 |
| JP | 2014112316 | 6/2014 |
| WO | 2001082202 A2 | 11/2001 |
| WO | WO 2011/053830 | 5/2011 |

OTHER PUBLICATIONS

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling In Community-Based Question Answering Services," Dalhousie University, Halifax, Nova Scotia; Feb. 2012.

Podgorny, et al., "Content Quality and User Ranking in TurboTax AnswerXchange," Proceedings of the European Conference on Social Media, University of Brighton UK, Jul. 10-11, 2014.

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Bartolome et al., "Processing Unstructured Voice of Customer Feedback for Improving Content Rankings in Customer Support Systems," U.S. Appl. No. 15/094,653, filed Apr. 8, 2016.

Get Satisfaction [online]. Sprinklr, 2017 [retrieved on Nov. 22, 2017]. Retrieved from the Internet: <URL: https://getsatisfaction.com/corp>.

Dror, et al., "From Query to Question in One Click: Suggesting Synthetic Questions to Searchers," International World Wide Web Conferences Steering Committee, May 13, 2013, pp. 391-401.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering user Queries of a Search Engine," Proceedings of the 10th International Conference on World Wide Web, pp. 162-168, ACM, 2001 (Year: 2001).

Negoescu et al., "Modeling Flickr Communities Through Probabilistic Topic-Based Analysis," IEEE Transactions on Multimedia, vol. 12, No. 5, pp. 399-416, Aug. 2010.

Ponzanelli et al., "Understanding and Classifying the Quality of Technical Forum Questions," IEEE, 14th International Conference on Quality Software, pp. 343-352 (Year: 2014).

Wikipedia, "Incremental Search," Jul. 22, 2016. Retrieved from the internet on Mar. 11, 2020 <URL: https://en.wikipedia.org/w/index.php?title=incremental_search&oldid=731052532>, 5 pages (Year 2016).

Zolaktaf Zadeh, "Probabilistic Modeling in Community-Based Question Answering Services," Dalhousie University, Halifax, NS, Canada, pp. 1-62, Feb. 29, 2012, retrived from internet on Dec. 17, 2020 at https://dalspace.library.dal.ca/handle/10222/14584.

\* cited by examiner

METHOD AND SYSTEM FOR USER EXPERIENCE PERSONALIZATION IN DATA MANAGEMENT SYSTEMS USING MACHINE LEARNING

BACKGROUND

Millions of people turn to electronic data management systems for assistance in managing various kinds of data. Electronic data management systems represent a potentially efficient and convenient way to manage data of many kinds. For example, millions of people turn to electronic financial management systems for financial management assistance including tax return preparation, bookkeeping, accounting, and financial transaction monitoring.

Users of data management systems often develop questions regarding data management topics or regarding features of the data management systems or related to data management topics. Accordingly, many traditional data management systems provide self-help functionality that enables users to obtain help related to various topics while using the data management systems. In particular, users can enter search queries into a search field and receive links to various assistance topics in response to the search queries. Users can then select assistance topics from among the search results. In this way, traditional data management systems offer a way for users to obtain assistance in using the services of the data management systems.

While these self-help features provided by traditional data management systems can sometimes assist users, all too often the self-help features provide inadequate or misguided assistance. Users often enter search queries that are short, ambiguous, or very broad. In these cases, the traditional data management systems are unable to understand or identify the true intent of the users. Because the traditional data management systems are unable to understand the true nature of the users' queries, the traditional data management systems provide assistance topics to the users that are not relevant to the true needs of the users.

When users do not receive the assistance that they desire from the self-help features of the traditional data management systems, both the data management systems and the users can face adverse consequences. Some users may become frustrated and confused and may abandon the traditional data management systems. Other users may continue entering additional search queries, thereby causing the data management systems to spend large amounts of computing resources in performing additional fruitless searches for assistance topics that will help the users. Still other users may decide to make a telephone call to the data management system and speak with an expert, a process that can be very expensive and time consuming to both the data management systems operators and to the users.

All of these drawbacks are a result of the technical inability of the traditional data management systems to properly understand the intent of the users' search queries when users enter poorly worded, ambiguous, short, or otherwise deficient search queries. Accordingly, there exists a technical problem of correctly understanding the true intent of user queries and efficiently and effectively providing real time accurate assistance to users of data management systems. What is needed is a system and method that can provide a technical solution to the technical problem of technical problem of accurately identifying the needs of users.

SUMMARY

Embodiments of the present disclosure provide one or more technical solutions to the technical problem of correctly understanding the true intent of user queries and efficiently and effectively providing real time accurate assistance to users of data management systems. Embodiments of the present disclosure analyze user queries, including textual and spoken queries, based on both the terms included in the queries, and the attributes of the users that provided the queries. In particular, embodiments of the present disclosure train an analysis model with both unsupervised and supervised machine learning processes to accurately identify the true intent of a user's query based on the text of the query and the attributes of the user that are known to the data management system. The attributes can include click stream data indicating how the user has navigated through various screens of a data management interview, demographics data associated with the user, and data provided by the user for data management purposes. Embodiments of the present disclosure provide personalized assistance to the user based on the analysis performed by the analysis model.

Embodiments of the present disclosure address some of the shortcomings associated with traditional data management. A data management system in accordance with embodiments of the present disclosure utilizes supervised and unsupervised machine learning processes in order to provide accurate personalized assistance to users. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

Figure 1:
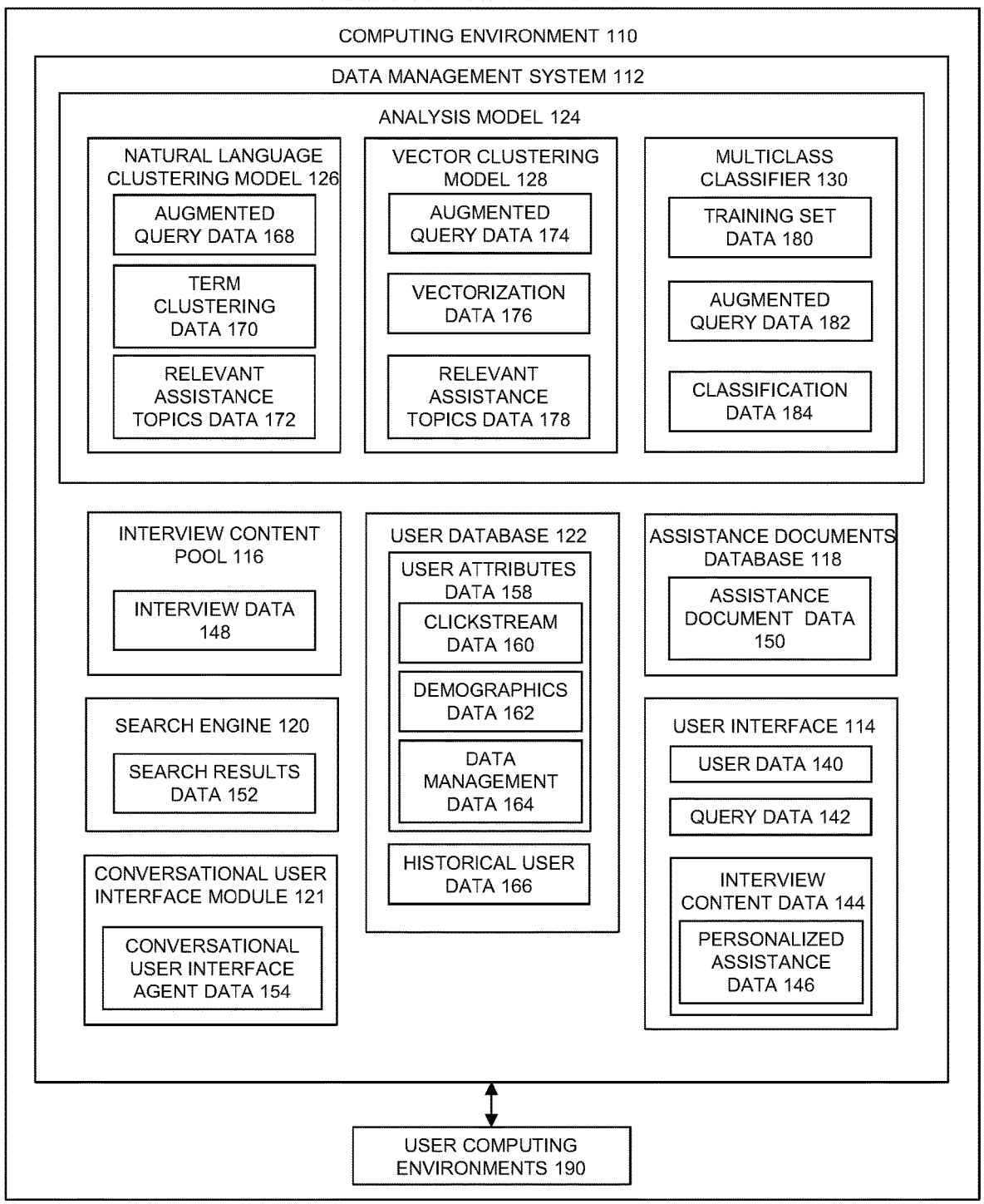
FIG. 1 is a block diagram of software architecture for accurately identifying the needs of users of a data management system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Using the disclosed embodiments of a method and system for accurately identifying the needs of users of a data management system, a method and system for accurately identifying the needs of users of a data management system more accurately is provided. Therefore, the disclosed embodiments provide a technical solution to the long standing technical problem of correctly identifying the true intent of a user search query and providing assistance to users of data management systems.

The disclosed embodiments of a method and system for accurately identifying the needs of users of a data management system are also capable of dynamically adapting to constantly changing fields such as data managements systems. Consequently, the disclosed embodiments of a method and system for accurately identifying the needs of users of a data management system also provide a technical solution to the long standing technical problem of static and inflexible data management systems.

The result is a much more accurate, adaptable, and robust method and system for accurately identifying the needs of users of a data management system. This, in turn, results in less human and processor resources being dedicated to providing category recommendations and to correcting problems associated with selecting incorrect categories when recommending content to a user. Thus, embodiments of the present disclosure lead to the usage of fewer processing resources, usage of fewer memory storage assets, and less communication bandwidth being utilized to transmit data for analysis.

The disclosed method and system for accurately identifying the needs of users of a data management system does not encompass, embody, or preclude other forms of innovation in the area of data management. In addition, the disclosed method and system for accurately identifying the needs of users of a data management system is not related to any fundamental economic practice, fundamental data processing practice, mental steps, or pen and paper-based solutions, and is, in fact, directed to providing solutions to new and existing problems associated with data management systems. Consequently, the disclosed method and system for accurately identifying the needs of users of a data management system, does not encompass, and is not merely, an abstract idea or concept.

FIG. 1 illustrates a block diagram of a production environment 100 for accurately identifying the needs of users of a data management system, according to one embodiment. Embodiments of the present disclosure provide methods and systems for accurately identifying the needs of users of a data management system, according to one embodiment. In particular, embodiments of the present disclosure utilize supervised and unsupervised machine learning processes to train an analysis model to identify assistance topics that are relevant to a query of a user based on the plain language of the query and the attributes of the user that are known to the data management system, such as click stream data, user demographics data, and the data provided by the user for data management purposes. Embodiments of the present disclosure utilize the analysis model to accurately understand the intent of a user's query even when the query is poorly worded. The analysis model is able to accurately understand the intent of a user even when the data management system has only a small amount of data related to the user.

In one embodiment, the data management system trains the analysis model with an unsupervised machine learning process to identify assistance topics that are relevant to a user query by generating an augmented query by combining the text of the user query with additional query terms based on the attributes of the user. The analysis model utilizes a natural language clustering process, such as a Latent Dirichlet Allocation (LDA) process, to identify assistance topics that are related to the augmented query. The data management system provides personalized assistance to the user based on the assistance topics identified by the analysis model.

In one embodiment, the data management system trains the analysis model with an unsupervised deep learning machine learning process to identify assistance topics that are relevant to a user query by generating an augmented query by combining the text of the user query with additional query terms based on the attributes of the user. The analysis model converts the terms of the augmented query into numerical vectors by performing a vectorization process on the terms of the augmented query. The analysis model then identifies assistance topics that are relevant to the augmented query by performing a vector clustering process on the numerical vectors representing the terms of the augmented query. The data management system provides personalized assistance to the user based on the assistance topics identified by the analysis model.

In one embodiment, the analysis model includes a multiclass classifier. The data management system trains the multiclass classifier with a supervised machine learning process in order to identify assistance topics that are relevant to a user query. The multiclass classifier is trained to identify assistance topics based on the language of the query and the attributes of the user. The multiclass classifier classifies the query as being relevant to one or more assistance topics based on the language of the query and the attributes of the user. The data management system provides personalized assistance to the user based on the assistance topics identified by the multiclass classifier.

In one embodiment, the analysis model includes multiple analysis sub models. Each sub-model is trained with a respective machine learning process, such as the supervised, unsupervised, and deep learning unsupervised machine learning processes set forth above. In one embodiment, the analysis model utilizes two or more of the sub models in identifying relevant assistance topics. In one embodiment, the analysis model utilizes only a single sub model in identifying relevant assistance topics. In one embodiment, each sub model can be considered a separate analysis model.

In one embodiment, the data management system provides personalized assistance to the user in the form of providing search results to the user based on the analysis of the analysis model. In one embodiment, the data management system provides personalized assistance to the user by providing data from one or more assistance topics identified as being relevant to the user based on the analysis of the analysis model. In one embodiment, the data management system provides personalized assistance to the users, by engaging the user with a conversational interface unit selected based on the analysis of the analysis model.

In addition, the disclosed method and system for accurately identifying the needs of users of a data management system provides for significant improvements to the technical fields of data management, data processing, and data transmission.

In addition, as discussed above, the disclosed method and system for accurately identifying the needs of users of a data management system provides for the processing and storage of smaller amounts of data related to providing assistance to the users. Because relevant assistance topics are identified efficiently, fewer system resources are devoted to performing additional searches based on inadequate initial search results. Consequently, using the disclosed method and system for accurately identifying the needs of users of a data management system results in more efficient use of human and non-human resources, fewer processor cycles being utilized, reduced memory utilization, and less communications bandwidth being utilized to relay data to, and from, backend systems and client systems, and various systems and parties. As a result, computing systems are transformed into faster, more efficient, and more effective computing systems by implementing the method and system for accurately identifying the needs of users of a data management system.

As seen in FIG. 1, the production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to various embodiments.

In one embodiment, the computing environment 110 includes a data management system 112. The data management system 112 can include a user interface 114, an interview content pool 116, an assistance documents database 118, a search engine 120, a conversational user interface module 121, a user database 122, and an analysis model 124, according to various embodiments. The analysis model 124 can include a natural language clustering model 126, a vector clustering model 128, and a multiclass classifier 130, according to various embodiments.

In one embodiment, the data management system 112 is an electronic data management system that assists users to manage their data. In one embodiment, the data management system 112 is a financial management system. The financial management system can include one or more of a tax return preparation system, a bookkeeping system, an accounting system, and a financial transaction monitoring system, according to various embodiments. Users provide their financial data to the financial management system and the financial management system provides financial management services to the users.

In one embodiment, the data management system 112 utilizes the user interface 114 to enable the users of the data management system 112 to interact with the data management system 112. The user interface 114 enables users to access the data management services of the data management system 112. The user interface 114 enables users to provide data and instructions to the data management system 112. The user interface 114 enables the data management system 112 to provide data to the users in conjunction with the data management services provided by the data management system 112.

In one embodiment, the user interface 114 enables the data management system 112 to interface with user computing environments 190. The user computing environments 190 include computing environments utilized by users of the data management system 112. The user computing environments include one or more of desktop computing devices, mobile phone computing devices, tablet computing devices, laptop computing devices, and cloud-based computing devices. The user computing environments 190 include computing environments utilized by users of the data management system 112 to access the data management services of the data management system 112. The user computing environments 190 access the data management system 112 via the user interface 114 in order to provide data to the data management system 112 and to receive data from the data management system 112.

In one embodiment, one or more components of the data management system 112, or portions of one or more components of the data management system 112, are implemented in the user computing environments 190. Thus, in one embodiment, some of the processing, software, and memory resources associated with functionality of the data management system 112 are implemented in the user computing environments 190.

In one embodiment, users of the data management system 112 receive a data management interview from the data management system 112 via the user interface 114. Users provide user data 140 to the data management system 112 via the user interface 114. The data management system 112 provides interview content data 144 to the users via the user interface module 114. The user data 140 can include personal information related to the user, demographics data related to the user, and data that the user wishes to be managed by the data management system 112. The user may provide user data 140 in response to questions posed by the data management system 112 during the data management interview. In an example in which the data management system 112 is a financial management system, the user data 140 can include financial data of the user related to the financial management services provided by the financial management system.

In one embodiment, the data management system 112 includes an interview content pool 116. The interview content pool 116 includes interview data 148. The interview data 148 guides a user through a series of data management topics, asks questions, and invites the user to provide data related to data management topics and questions. The user interface module 114 populates the interview content data 144 from the interview data 148. The interview content pool 116 includes topics, questions, and user experience elements that can be presented to the user during the data management interview.

In one embodiment, the interview data 148 includes a large number of data management interview pages which can be presented to the users with the interview content data 144 as part of the data management interview. The users can make selections to navigate through the various interview pages during the data management interview. In one embodiment, the interview data 148 associates with each interview page, a respective identification number. In one embodiment, the interview data 148 associates various data management topics with each interview page in accordance with the content of each interview page.

In one embodiment, the data management system 112 includes a user database 122. The user database 122 includes user attributes data 158 associated with each user of the data management system 112. The user attributes data 158 includes the various kinds of data collected by the data management system 112 related to the users.

In one embodiment, the user attributes data 158 includes clickstream data 160. The clickstream data 160 indicates how the user has progressed through the data management interview. The clickstream data 160 can include data indicating which data management pages the user has accessed during the data management interview. The clickstream data 160 can include a list of identification numbers for each data management page that the user has accessed. In one embodiment, the clickstream data 160 can include data indicating how long a user remained on each data management page, selections made by the user in the various interview pages, advertisements to which the user was exposed, advertisements that the user investigated, which interview pages the user has most recently visited, assistance topics accessed by the user, and other behavioral data indicating actions that the user undertook in relation to the data management interview.

In one embodiment, the user attributes data 158 includes demographics data 162. The demographics data 162 includes data indicating the demographics of each user. In one embodiment, the demographics data 162 includes, for each user, an age range of the user, a gender of the user, a geolocation of the user, marital status information of the user, parental information of the user, and other kinds of personal demographics data related to the user.

In one embodiment, the user attributes data 158 includes data management data 164. The data management data 164 includes data received from the user, or related to the user, for data management purposes. In an example in which the data management system 112 is a tax return preparation system, the data management data 164 can include tax related data provided by the user, such as W-2 information, income information, investment information, charitable donations, work-related deductions, and other kinds of tax related data that can be collected from the user or related to a user for purposes of preparing a tax return for the user. Accordingly, the data management data 164 includes the type of data provided by the user for receiving data management services from the data management system 112. In one embodiment, there is overlap between the data management data 164 and the demographics data 162 such that the data management data 164 can include demographics data related to the user.

In one embodiment, the user database 122 includes historical user data 166. The historical user data 166 includes data management data associated with historical users of the data management system 112. The historical user data 166 can include the same types of data included in the user attributes data 158 for historical users of the data management system 112. In one embodiment, the historical user data 166 includes data related to current users of the data management system 112.

In one embodiment, the data management system 112 includes an assistance documents database 118. The assistance documents database 118 includes assistance document data 150. In one embodiment, the assistance document data 150 includes a plurality of assistance documents. The assistance documents include assistance topics as well as solutions to problems related to the assistance topics. Each assistance document corresponds to an assistance topic with one or more solutions or answers related to the assistance topic.

In one embodiment, the assistance documents database 118 is a social question-and-answer database. In a social question-and-answer database, each assistance document corresponds to a question or query provided by a user of the data management system 112. In the social question answer database, the answers or solutions to a query made by a user are provided by other users of the data management system 112. A single assistance document can include multiple answers or solutions provided by various users of the social question-and-answer support system.

In one embodiment, an assistance document includes answers provided by regular users of the data management system 112, or by users that have been designated as trusted users of the data management system 112. Furthermore, in one embodiment, an assistance document includes answers provided by experts or other personnel associated with the data management system 112.

In one embodiment, each assistance document includes feedback data based on feedback provided by users of the data management system 112 that have viewed the assistance document. In one embodiment, the assistance document includes functionality that enables users of the data management system 112 to provide feedback related to the query associated with the assistance document and related to the answers provided by the various users of the data management system 112 that have accessed the assistance document. For example, users of the data management system 112 that access an assistance document may be invited to identify, for each answer provided, whether the answer was helpful or unhelpful. Thus, each answer can have both positive and negative feedback from users of the data management system that have viewed the assistance document associated with the answers. In one embodiment, the feedback data includes feedback for the query and feedback for the answers. In one embodiment, the feedback for each item in the assistance document includes positive feedback such as a thumbs-up, a confirmation that the question or answer was helpful, or other kinds of positive feedback. In one embodiment, the feedback for each item in the assistance document includes negative feedback such as a thumbs down or an assertion that the answer was unhelpful. Feedback can include structured feedback such as up or down votes, starts, etc. Feedback can also include unstructured feedback such as text comments added by the users in addition to the votes to give the rationale for the votes.

In one embodiment, each assistance document from the assistance document data includes a query. The query corresponds to the search query provided by the user that originally generated the assistance document. The query can include a question, a full statement, or one or more search terms. Thus, the query can include full sentences, sentence fragments, or even an individual word or two. Furthermore, sentences can be grammatically correct or incorrect, can include or not include punctuation marks, can be well formulated or poorly formulated, or have other characteristics that may differentiate assistance documents in terms of quality or intent.

In one embodiment, each assistance document from the assistance document data 150 includes answer data. The answer data includes the answers or solutions provided by users, trusted users, or personnel associated with the data management system 112. An assistance document may include a single answer, multiple answers, or no answer at all. An assistance document can also include optional comments. In addition, an assistance document may have a comment, but no answers.

In one embodiment, users of the data management system 112 can provide query data 142 to the data management system 112. The query data 142 corresponds to a query from the user for assistance from the data management system 112 related to one or more aspects of the data management system 112. The query data 142 can include one or more search terms. When a user of the data management system 112 provides query data 142, the data management system 112 provides personalized assistance data 146 to the user in response to the query. Accordingly, the data management system 112 enables users to provide query's and to receive personalized assistance in response to the queries, as will be set forth in more detail below.

In one embodiment, the data management system 112 includes a search engine 120 to assist in providing personalized assistance data 146 to users in response to receiving query data 142 from the users. In particular, when the user provides query data 142, the search engine 120 performs a search of the assistance documents database 118 in order to identify assistance documents that are relevant to the query data 142. As will be set forth in more detail below, in one embodiment, the search engine 120 cooperates with the analysis model 124 to identify assistance documents that are relevant to the user based on the user attributes data 158 and the query data 142.

In one embodiment, the search engine 120 generates search results data 152 in response to the query data 142 and in cooperation with the analysis model 124. In one embodiment, the search results data 152 includes one or more assistance documents, or links to one or more assistance documents, likely to be relevant to the user based on the query data 142 and the user attributes data 158.

In one embodiment, the data management system 112 includes multiple search engines 120. Each search engine 120 can be specialized to search for assistance documents that correspond to particular assistance topics, as will be set forth in more detail below. Generating the personalized assistance data 146 can include selecting, with the analysis model 124, a search engine 120 based on the user attributes data 158 and the query data 142. In one embodiment, the search engine 120, or search engines 120, are part of the analysis model 124. In one embodiment, the multiple search engines may include multiple search rankers. Each search ranker is trained on the data collected for a particular sub-domain.

In one embodiment, the data management system 112 includes a conversational user interface module 121. The data management system 112 utilizes the conversational user interface module 121 to provide assistance to users of the data management system 112 in response to receiving the query data 142. The conversational user interface module 121 provides assistance to the users in the form of a dialogue or conversation with the users. Accordingly, in one embodiment, the data management system 112 provides personalized assistance data 146 corresponding to assistance data provided to the user via the conversational user interface module 121 and in the form of a conversation or dialogue with the user.

In one embodiment, the conversational user interface module 121 is a textual conversational user interface module 121. When a user enters query data 142, the conversational user interface module response to the user in the form of a textual conversation. The user can provide a natural language question with the query data 142 in text form and can receive personalized assistance data 146 from the conversational user interface module 121 in the form of a text based natural language response.

In one embodiment, the conversational user interface module 121 is an audible conversational user interface. The user provides query data 142 in the form of audible spoken query data. The data management system 112 analyzes the audible query in order to determine the meaning of the audible query. The data management system 112 provides personalized assistance data 146 in the form of an audible response to the user via the conversational user interface module 121. The user and the conversational user interface module 121 can carry on an audible conversation until the user has received personalized assistance data 146 that satisfies the user's question.

In one embodiment, the conversation user interface module 121 is configured to converse with users via both text and audible spoken conversation.

In one embodiment, the conversational user interface module 121 includes conversational user interface agent data 154. The conversational user interface agent data 154 corresponds to multiple conversational user interface agents. Each conversational user interface agent is a computerized agent capable of caring on a conversation with a user of the data management system 112. The data management system 112 utilizes the analysis model 124 to select a conversational user interface agent that is most likely to provide relevant assistance to the user based on the user attributes data 158 and the query data 142. The In one embodiment, the conversational user interface module 121 cooperates with the analysis model 124 to provide personalized assistance data 146 to the user. In one embodiment, the conversational user interface module 121 is part of the analysis model 124.

In one embodiment, the data management system 112 utilizes the analysis model 124 to assist in providing personalized assistance data 146 to users of the data management system 112 in response to receiving query data 142. The analysis model 124 generates personalized assistance data 146 based on analysis of the query data 142 and user attributes data 158.

In one embodiment, users of the data management system 112 may provide query data 142 that includes inquiries that, taken by themselves, can be difficult to properly understand. As set forth previously, traditional data management systems typically fail to identify the true intent of a user's query when that query is one or two terms or words long, is ambiguous, or otherwise poorly worded. The data management system 112 utilizes the analysis model 124 to overcome these drawbacks of traditional data management systems. In one embodiment, the words or terms in the query include tokens. An example of a tax related token includes 1099-MISC which is a non-standard word that represents a tax form. Thus, the words or terms in the query can include field specific tokens that are not standard words.

In one embodiment, the analysis model 124 is able to identify the true intent of the user's query even when the query is very short, is ambiguous, or is otherwise poorly worded. The analysis model 124 analyzes not only the query data 142, but user attributes data 158 related to the user that submitted the query, in order to identify, with a much higher degree of accuracy than traditional data management systems, the likely true intent of the query. Furthermore, the analysis model 124 is able to reliably identify the true intent of the user's query even for new users of the data management system 112 for whom there is very little user attributes data 158 collected so far. Thus, the analysis model 124 is able to use even small amounts of user attributes data 158 in order to reliably identify the true intent of the user's query and to provide personalized assistance data 146 to the user.

In one embodiment, the data management system 112 trains the analysis model 124 with both unsupervised and supervised machine learning processes to accurately identify assistance topics related to the query data 142 provided by the user. In one embodiment, the analysis model 124 is able to execute multiple algorithms, processes, or models based on the various unsupervised and supervised machine learning processes in order to identify assistance topics that are likely to be relevant to users that submit query data 142. In one embodiment, the analysis model 124 selectively utilizes one or more available algorithms or processes based on the query data 142 and the user attributes data 158. For example, the analysis model 124 may execute a first algorithm and identify one or more assistance topics that have a very high probability of being relevant to a query provided by the user.

The analysis model 124 may then determine that additional analysis utilizing other algorithms is not necessary. Alternatively, the analysis model 124 may execute a first algorithm and initially identify assistance topics that have a less than threshold probability of being relevant to the query data 142. The analysis model 124 may then proceed to analyze the query data 142 and user attributes data 158 in accordance with one or more additional algorithms or processes in order to identify assistance topics that have a satisfactory probability of being relevant to the query data 142.

In one embodiment, the analysis model 124 includes a natural language clustering model 126. The data management system 112 trains the natural language clustering model 126 in accordance with an unsupervised machine learning process to identify assistance topics that are likely to be relevant to query data 142 provided by the user based on the natural language terms included in the query data 142 and natural language terms associated with the user attributes data 158. In particular, the natural language clustering model 126 performs one or more clustering algorithms on the terms included in the query data 142, and other natural language terms based on the user attributes data 158 in order to identify assistance topics that are likely to be relevant to the combination of terms.

In one embodiment, when the data management system 112 receives query data 142 including one or more query terms from a user, the natural language clustering model 126 generates augmented query data 168 from the query data 142 and from the user attributes data 158 associated with the user. The augmented query data includes the natural language terms from the query data 142 and other terms selected based on the user attributes data 158. Thus, the augmented query data 168 is a combination of the original natural language terms from the query data 142, and the additional natural language terms from the user attributes data 158.

In one embodiment, after the natural language clustering model 126 has generated augmented query data 168, the natural language clustering model 126 generates term clustering data 170. The natural language clustering model 126 generates the term clustering data 170 by performing one or more clustering algorithms on the augmented query data 168. The term clustering data 170 identifies assistance topics that are likely irrelevant to the combination of terms and the augmented query data 168.

In one embodiment, after the natural language clustering model has generated term clustering data 170, the analysis model 124 generates the relevant assistance topics data 172. The relevant assistance topics data 172 identifies one or more assistance topics that are likely relevant to the query data 142 based on the user attributes data 158 and the query data 142. The data management system 112 then generates personalized assistance data 146 in response to the query data 142 based on the relevant assistance topics data 172 generated by the natural language clustering model 126.

In one embodiment, the data management system 112 generates personalized assistance data 146 based on the relevant assistance topics data 172 by selecting one or more assistance documents from the assistance document data 150 that correspond to the assistance topics identified by the relevant assistance topics data 172. The data management system 112 then provides personalized assistance data 146 to the user including the identified assistance documents from the assistance documents data 150, portions of the assistance documents, or links to the assistance documents.

In one embodiment, the data management system 112 generates personalized assistance data 146 based on the relevant assistance topics data 172 by selecting a search engine from the plurality of search engines 120 in accordance with the relevant assistance topics data 172. The selected search engine 120 then performs a search among the assistance documents data 150 based on the relevant assistance topics data 172 and/or the augmented query data 168. The selected search engine 120 generates search results data 152 indicating one or more assistance documents from the assistance document data 150. The data management system 112 then outputs personalized assistance data 146 to the user including the identified assistance documents from the assistance documents from the search results data 152, portions of the assistance documents from the search results data 152, or links to the assistance documents from the search results data 152.

In one embodiment, the data management system 112 generates personalized assistance data 146 by identifying a conversational user interface agent from the conversational user interface agent data 154 that is most suited to assist the user based on the relevant assistance topics data 172. The personalized assistance data 146 corresponds to a natural language conversation carried on between the conversational user interface agent and the user via the user interface 114.

In one embodiment, the data management system 112 generates personalized assistance data 146 by identifying assistance documents from the assistance document data 150 based on the relevant assistance topics data 172, and then providing information to the user from the assistance documents via the conversational user interface module 121 in the form of a natural language conversation. In one embodiment, the search engine 120 performs a search of the assistance document data based on the relevant assistance topics data 172 and identifies relevant assistance documents. The conversational user interface module 121 them provides personalized assistance data 146 to the user based on the identified assistance documents.

In one example, the data management system 112 is a tax return preparation system. A user of the tax return preparation system provides query data 142 including only the phrase "W-2". By itself, this query is too short and ambiguous to reliably identify the intent of the user. However, the user attributes data 158 includes clickstream data 160 indicating that the user has visited two interview screens. One interview screen is a screen on which people look for definition of W-2. The natural language clustering model 126 generates augmented query data 168 by combining "W-2" with natural language terms associated with the two identified screens from the clickstream data. The natural language clustering model 126 analyzes the augmented query data 142 and identifies two likely intents of the query: "what is the definition of W-2" and "how do I import a W-2". The data management system 112 can then identify relevant assistance documents from the assistance document data 150 and provide personalized assistance data 146 to the user based on the identified assistance documents.

In one embodiment, the analysis model 124 includes a vector clustering model 128. The data management system 112 trains the vector clustering model 128 in accordance with a deep learning unsupervised machine learning process to identify assistance topics that are likely to be relevant to query data 142 provided by the user based on vector representations or vectorized representations of the terms included in the query data 142 and terms associated with the user attributes data 158. In particular, the vector clustering model 128 adds, to query data 142, terms based on the user attributes data 158 and converts the combined terms into numerical vectors. The vector clustering model 128 performs one or more vector clustering algorithms on the vectors representing the combination of terms in order to identify assistance topics that are likely to be relevant to the combination of terms.

In one embodiment, when the data management system 112 receives query data 142 including one or more query terms from a user, the vector clustering model 128 generates augmented query data 174 from the query data 142 and from the user attributes data 158 associated with the user. The augmented query data 174 includes the terms from the query data 142 and other terms selected based on the user attributes data 158. Thus, the augmented query data 174 is a combination of the original terms from the query data 142, and the additional terms from the user attributes data 158. In one embodiment, the augmented query data 174 is the augmented query data 168; i.e. the vector clustering model 128 receives augmented query data 168 from the natural language clustering model 126. Alternatively, the vector clustering model 128 generates augmented query data 174 separate from the natural language clustering model 126.

In one embodiment, after the vector clustering model 128 has generated augmented query data 174, the vector clustering model 128 generates vectorization data 176. In one embodiment, the vector clustering model 128 generates the term clustering data 170 by vectorizing, i.e. converting into vectors, the terms in the augmented query data 174.

In one embodiment, the vector clustering model 128 uses a Word2vec, Doc2vec, or Sentence2vec model to generate the vectorization data 176 by converting each word into a vector. In one embodiment, the vectorization data includes word embeddings. In one embodiment, the Word2vec model includes a two-layer neural network. The two-layer neural network is trained to reconstruct the linguistic context of words. The Word2vec model takes as its input the description terms from the historical user data 166 and produces the vector space with a very large number of dimensions in which each unique description term from the historical user data 166 is represented by a vector. The vectors are generated such that description terms that appear in common contexts are located in close proximity to one another in the vector space.

In one embodiment, the vector clustering model 128 applies a clustering algorithm to the vectors in accordance with a deep learning unsupervised machine learning process in order to group the augmented query data 174 based on the vectorization data 176. In one embodiment, the vector clustering model 128 applies a clustering algorithm to the vectorization data 176. The clustering algorithm finds the closest neighbors of each vector in the vectorization data 176. Vectors that are grouped together are vectors that tend to appear in similar contexts in the historical user data 166. The vector clustering model 128 identifies assistance topics that are likely relevant to the query data 142 based on the clustering of vectors. The vector clustering model 128 generates relevant assistance topics data 178 identifying the relevant assistance topics.

In one embodiment, the vector clustering algorithm includes a K-nearest neighbor algorithm. The K-nearest neighbor algorithm is applied to the vectorization data 176 in order to identify the K-nearest neighbors to each vector in the vector space. The K-nearest neighbor algorithm clusters the vectors based on the K nearest neighbors of each vector. In one embodiment, the K nearest neighbor algorithm finds the K nearest neighbors of a vector by calculating the Euclidean distance between vectors. In one embodiment, the K nearest neighbor algorithm determines proximity of vectors by calculating the overlapping metric or Hamming distance.

In one embodiment, the vector clustering model 128 generates vectorization data 176 based on the user attributes data 158. In one embodiment, the vector clustering model 128 analyzes the user attributes data 158 and adds terms to the augmented query data 174 based on the user attributes data 158. For example, if the data management data 164 indicates that the user has not entered W-2 data, then the vector clustering model 128 adds "W-2 not entered" into the augmented query data 174. Conversely, if the data management data 164 indicates that the user has entered W-2 data, then the vector clustering model 128 adds "W-2 entered" to the augmented query data 174. If the data management data 164 indicates that the user is in a particular income bracket, then the vector clustering model 128 adds words indicating that the user is in that particular income bracket into the augmented query data 174. Likewise, if the demographics data 162 indicates that the user is married, has children, or lives in a particular location, then the vector clustering model 128 adds terms to the augmented query data 174 indicating that the user is married, has children, and lives in the particular area. The vector clustering model 128 can add additional terms based on the clickstream data 160. The vector clustering model 128 then generates vectorization data 176 by converting the terms from the augmented query data 174 for the vectors. The vector clustering model 128 then generates relevant assistance topics data 178 by performing a vector clustering algorithm on the vectorization data 176. The vector clustering model 128 generates relevant assistance topics data 178 based on the vector clustering data.

In one embodiment, after the vector clustering model 128 has generated term clustering data 170, the vector clustering model 128 generates the relevant assistance topics data 178. The relevant assistance topics data 178 identifies one or more assistance topics that are likely to be relevant to the query data 142 based on the user attributes data 158 and the query data 142. The data management system 112 then generates personalized assistance data 146 in response to the query data 142 based on the relevant assistance topics data 178 generated by the vector clustering model 128.

In one embodiment, the data management system 112 generates personalized assistance data 146 based on the relevant assistance topics data 178 by selecting one or more assistance documents from the assistance document data 150 that correspond to the assistance topics identified by the relevant assistance topics data 178. The data management system 112 then provides personalized assistance data 146 to the user including the identified assistance documents from the assistance documents data 150, portions of the assistance documents, or links to the assistance documents.

In one embodiment, the data management system 112 generates personalized assistance data 146 based on the relevant assistance topics data 178 by selecting a search engine from the plurality of search engines 120 in accordance with the relevant assistance topics data 178. The selected search engine 120 then performs a search among the assistance documents data 150 based on the relevant assistance topics data 178 and/or the augmented query data 174. The selected search engine 120 generates search results data 152 indicating one or more assistance documents from the assistance document data 150. The data management system 112 then outputs personalized assistance data 146 to the user including the identified assistance documents from the assistance documents from the search results data 152, portions of the assistance documents from the search results data 152, or links to the assistance documents from the search results data 152.

In one embodiment, the data management system 112 generates personalized assistance data 146 by identifying a conversational user interface agent from the conversational user interface agent data 154 that is most suited to assist the user based on the relevant assistance topics data 178. The personalized assistance data 146 corresponds to a natural language conversation carried on between the conversational user interface agent and the user via the user interface 114.

In one embodiment, the data management system 112 generates personalized assistance data 146 by identifying assistance documents from the assistance document data 150 based on the relevant assistance topics data 178, and then providing information to the user from the assistance documents via the conversational user interface module 121 in the form of a natural language conversation. In one embodiment, the search engine 120 performs a search of the assistance document data based on the relevant assistance topics data 178 and identifies relevant assistance documents. The conversational user interface module 121 them provides personalized assistance data 146 to the user based on the identified assistance documents.

In one embodiment, the vector clustering model 128 is trained with an unsupervised deep learning machine learning process. The vector clustering model 128 retrieves historical user data 166 from the user database 122. The historical user data 166 includes clickstream data, demographics data, and data management data related to the historical users of the data management system. The vector clustering model 128 utilizes the deep learning unsupervised machine learning process to cluster or group various query terms and terms collected based on the historical user data 166.

In one embodiment, the analysis model 124 includes a multiclass classifier 130. The data management system 112 trains the multiclass classifier 130 in accordance with supervised machine learning process to identify assistance topics that are likely to be relevant to query data 142 provided by the user based on terms included in the query data 142 and terms associated with the user attributes data 158. In particular, the multiclass classifier 130 adds, to query data 142, terms based on the user attributes data 158. The multiclass classifier 130 analyzes the augmented query data 182 and generates classification data 184. The classification data 184 indicates which assistance topics are likely relevant to the query data 142. The classification data 184 can be considered relevant assistance topics data, according to one embodiment.

In one embodiment, the multiclass classifier is trained with a supervised machine learning process utilizing the training set data 180. The training set data 180 includes historical user data 166 related to historical users of the data management system 112. The historical user data 166 includes user attributes data such as clickstream data, demographics data, and data management data. The historical user data 166 also includes previous search queries entered by the historical users. The historical user data 166 indicates search results based on the previous search queries and assistance documents that the user selected from the historical search results. Because the selections made by the historical users is known in the training set data 180, the multiclass classifier 130 can be trained to accurately predict assistance topics that are relevant to users based on the attributes of the historical users and the selections that they made from the search results data.

In one embodiment, the data management system 112 generates personalized assistance data 146 based on the classification data 184 by selecting one or more assistance documents from the assistance document data 150 that correspond to the assistance topics identified by the classification data 184. The data management system 112 then provides personalized assistance data 146 to the user including the identified assistance documents from the assistance documents data 150, portions of the assistance documents, or links to the assistance documents.

In one embodiment, the data management system 112 generates personalized assistance data 146 based on the classification data 184 by selecting a search engine from the plurality of search engines 120 in accordance with the classification data 184. The selected search engine 120 then performs a search among the assistance documents data 150 based on the classification data 184 and/or the augmented query data 174. The selected search engine 120 generates search results data 152 indicating one or more assistance documents from the assistance document data 150. The data management system 112 then outputs personalized assistance data 146 to the user including the identified assistance documents from the assistance documents from the search results data 152, portions of the assistance documents from the search results data 152, or links to the assistance documents from the search results data 152.

In one embodiment, the data management system 112 generates personalized assistance data 146 by identifying a conversational user interface agent from the conversational user interface agent data 154 that is most suited to assist the user based on the classification data 184. The personalized assistance data 146 corresponds to a natural language conversation carried on between the conversational user interface agent and the user via the user interface 114.

In one embodiment, the data management system 112 generates personalized assistance data 146 by identifying assistance documents from the assistance document data 150 based on the classification data 184, and then providing information to the user from the assistance documents via the conversational user interface module 121 in the form of a natural language conversation. In one embodiment, the search engine 120 performs a search of the assistance document data based on the classification data 184 and identifies relevant assistance documents. The conversational user interface module 121 them provides personalized assistance data 146 to the user based on the identified assistance documents.

In one embodiment, the natural language clustering model 126, the vector clustering model 128, and the multiclass classifier 130 are each sub models of the analysis model 124. Each sub-model is trained with a respective machine learning process, such as the supervised, unsupervised, and deep learning unsupervised machine learning processes described above. In one embodiment, the analysis model 124 utilizes two or more of the sub models in identifying relevant assistance topics. In one embodiment, the analysis model 124 utilizes only a single sub model in identifying relevant assistance topics. In one embodiment, each sub model can be considered a separate analysis model.

Embodiments of the present disclosure address some of the shortcomings associated with traditional data management systems that do not provide accurate and personalized assistance to users. A data management system in accordance with embodiments of the present disclosure utilizes supervised and unsupervised machine learning processes in order to provide accurate personalized assistance to users. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

Process

Figure 2:
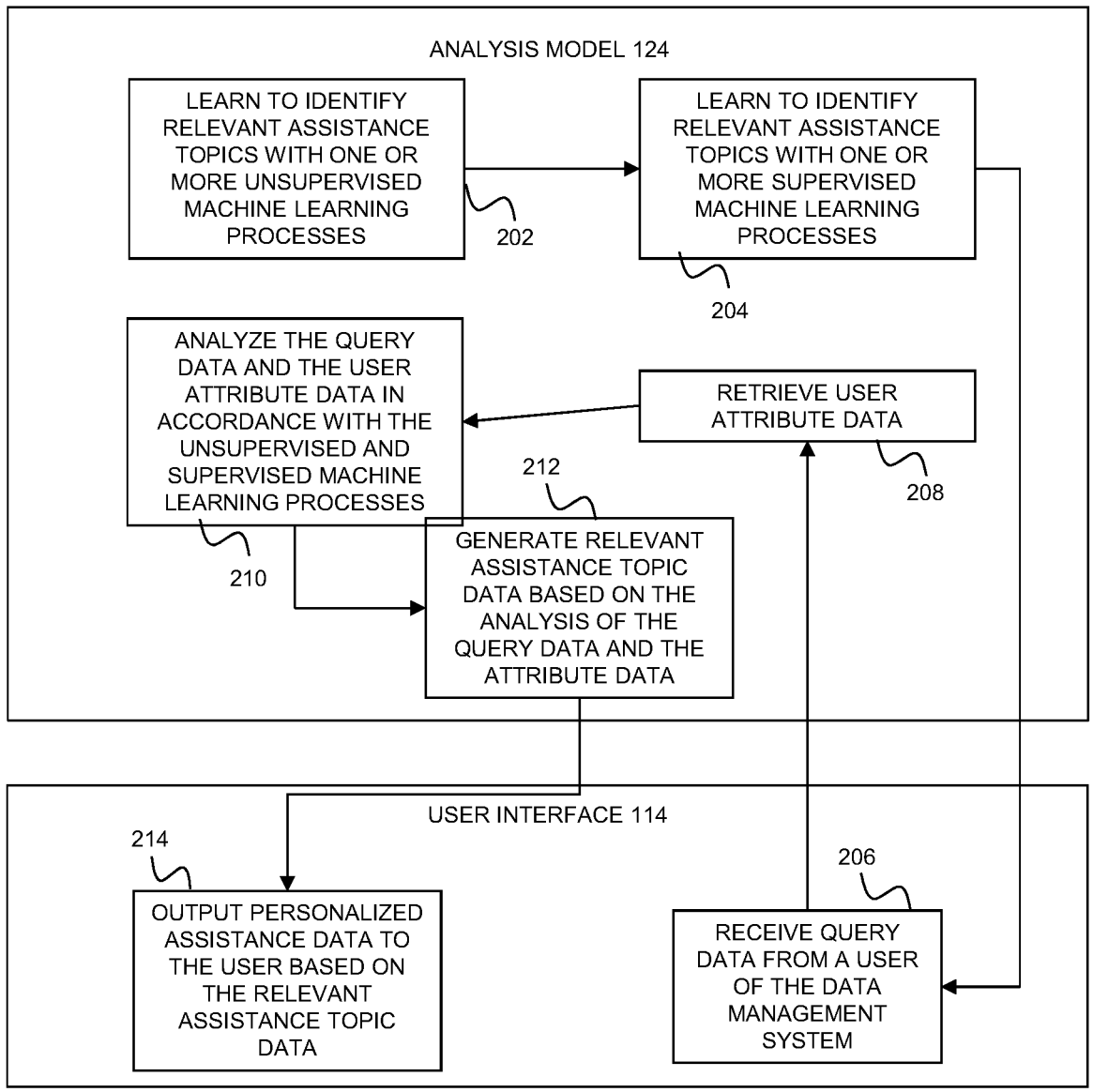
FIG. 2 is a block diagram of a process for accurately identifying the needs of users of a data management system, in accordance with one embodiment.

FIG. 2 illustrates a functional flow diagram of a process 200 for accurately identifying the needs of users of a data management system, in accordance with one embodiment.

Referring to FIG. 2, FIG. 1, and the description of FIG. 1 above, at block 202 the analysis model 124 learns to identify relevant assistance topics with one or more unsupervised machine learning processes using any of the methods, processes, and procedures discussed above with respect to FIG. 1, according to one embodiment. From block 202 the process proceeds to block 204.

At block 204 the analysis model 124 learns to identify relevant assistance topics with one or more supervised machine learning processes, using any of the methods, processes, and procedures discussed above with respect to FIG. 1, according to one embodiment. From block 204 the process proceeds to block 206.

At block 206 the user interface 114 receives query data from a user of the data management system, using any of the methods, processes, and procedures discussed above with respect to FIG. 1, according to one embodiment. From block 206 the process proceeds to block 208.

At block 208, the user interface 114 retrieves user attribute data, using any of the methods, processes, and procedures discussed above with respect to FIG. 1, according to one embodiment. From block 208 the process proceeds to block 210.

At block 210 the analysis model 124 analyzes the query data and the user attribute data in accordance with the unsupervised and supervised machine learning processes, using any of the methods, processes, and procedures discussed above with respect to FIG. 1, according to one embodiment. From block 210 the process proceeds to block 212.

At block 212 the analysis model 124 generates relevant assistance topic data based on the analysis of the query data and the attribute data, using any of the methods, processes, and procedures discussed above with respect to FIG. 1, according to one embodiment. If the search results data are satisfactory, the process proceeds from block 212 to block 214.

At block 214 the user interface 114 outputs personalized assistance data to the user based on the relevant assistance topic data, using any of the methods, processes, and procedures discussed above with respect to FIG. 1, according to one embodiment.

Those of skill in the art will recognize, in light of the present disclosure, that the process 200 can include different steps, different orders of steps, other than those represented in FIG. 2. All such other processes fall within the scope of the present disclosure.

Figure 3:
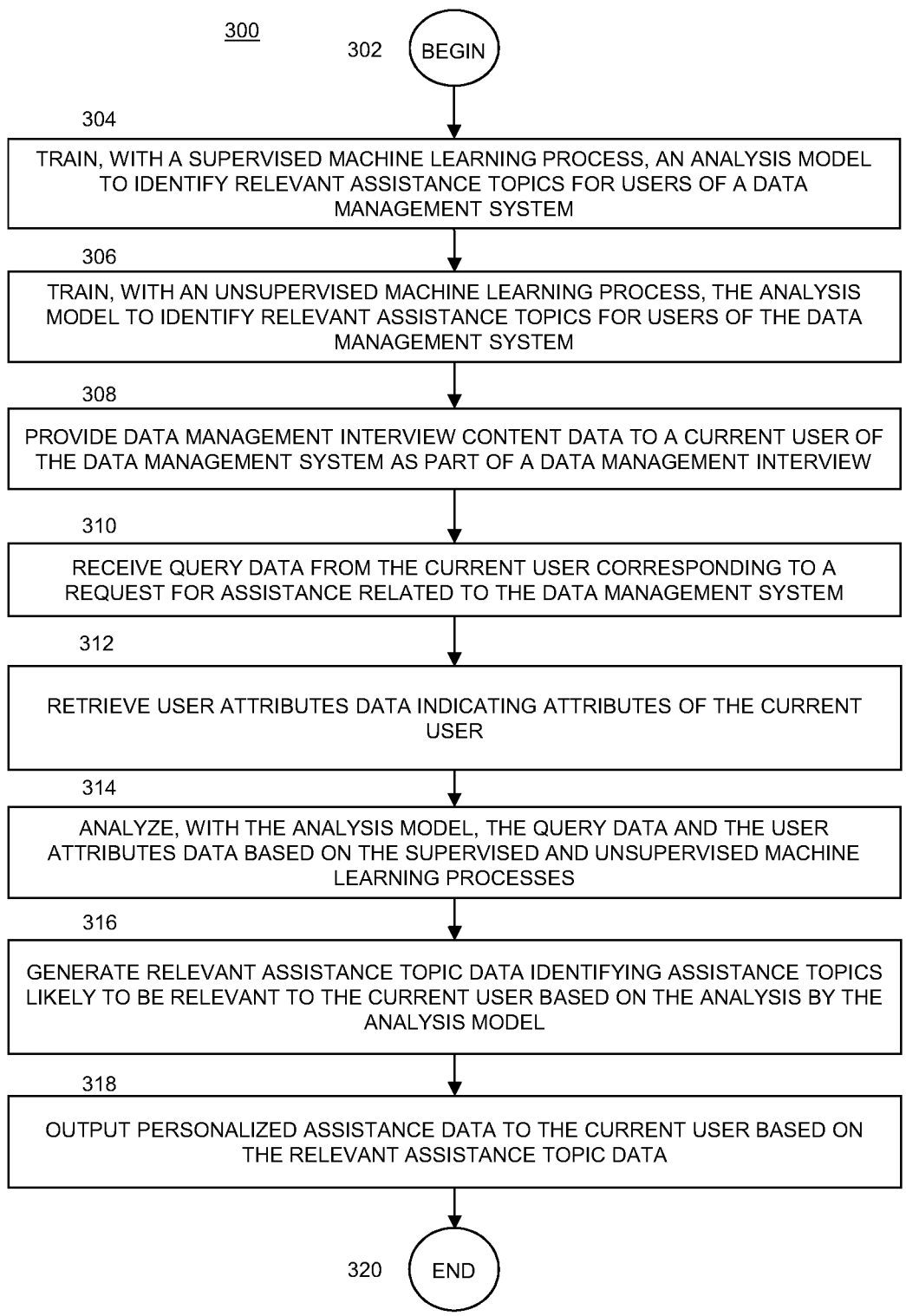
FIG. 3 is a flow diagram of a process for accurately identifying the needs of users of a data management system, in accordance with one embodiment.

FIG. 3 illustrates a flow diagram of a process 300 for accurately identifying the needs of users of a data management system, according to various embodiments.

Referring to FIGS. 1-3, and the description of FIGS. 1-2 above, in one embodiment, process 300 begins at BEGIN 302 and process flow proceeds to TRAIN, WITH A SUPERVISED MACHINE LEARNING PROCESS, AN ANALYSIS MODEL TO IDENTIFY RELEVANT ASSISTANCE TOPICS FOR USERS OF A DATA MANAGEMENT SYSTEM 304.

In one embodiment, at TRAIN, WITH A SUPERVISED MACHINE LEARNING PROCESS, AN ANALYSIS MODEL TO IDENTIFY RELEVANT ASSISTANCE TOPICS FOR USERS OF A DATA MANAGEMENT SYSTEM 304, an analysis model is trained, with a supervised machine learning process, to identify relevant assistance topics for users of a data management system, using any of the methods, processes, and procedures discussed above with respect to FIGS. 1-2.

In one embodiment, once an analysis model is trained, with a supervised machine learning process, to identify relevant assistance topics for users of a data management system at TRAIN, WITH A SUPERVISED MACHINE LEARNING PROCESS, AN ANALYSIS MODEL TO IDENTIFY RELEVANT ASSISTANCE TOPICS FOR USERS OF A DATA MANAGEMENT SYSTEM 304 process flow proceeds to TRAIN, WITH AN UNSUPERVISED MACHINE LEARNING PROCESS, THE ANALYSIS MODEL TO IDENTIFY RELEVANT ASSISTANCE TOPICS FOR USERS OF THE DATA MANAGEMENT SYSTEM 306.

In one embodiment, at TRAIN, WITH AN UNSUPERVISED MACHINE LEARNING PROCESS, THE ANALYSIS MODEL TO IDENTIFY RELEVANT ASSISTANCE TOPICS FOR USERS OF THE DATA MANAGEMENT SYSTEM 306, the analysis model is trained with an unsupervised machine learning process, to identify relevant assistance topics for users of the data management system, using any of the methods, processes, and procedures discussed above with respect to FIGS. 1-2.

In one embodiment, the analysis model is trained with an unsupervised machine learning process, to identify relevant assistance topics for users of the data management system at TRAIN, WITH AN UNSUPERVISED MACHINE LEARNING PROCESS, THE ANALYSIS MODEL TO IDENTIFY RELEVANT ASSISTANCE TOPICS FOR USERS OF THE DATA MANAGEMENT SYSTEM 306, process flow proceeds to PROVIDE DATA MANAGEMENT INTERVIEW CONTENT DATA TO A CURRENT USER OF THE DATA MANAGEMENT SYSTEM AS PART OF A DATA MANAGEMENT INTERVIEW 308.

In one embodiment, at PROVIDE DATA MANAGEMENT INTERVIEW CONTENT DATA TO A CURRENT USER OF THE DATA MANAGEMENT SYSTEM AS PART OF A DATA MANAGEMENT INTERVIEW 308, data management interview content data is provided to a current user of the data management system as part of a data management interview, using any of the methods, processes, and procedures discussed above with respect to FIGS. 1-2.

In one embodiment, once data management interview content data is provided to a current user of the data management system as part of a data management interview at PROVIDE DATA MANAGEMENT INTERVIEW CONTENT DATA TO A CURRENT USER OF THE DATA MANAGEMENT SYSTEM AS PART OF A DATA MANAGEMENT INTERVIEW 308, process flow proceeds to RECEIVE QUERY DATA FROM THE CURRENT USER CORRESPONDING TO A REQUEST FOR ASSISTANCE RELATED TO THE DATA MANAGEMENT SYSTEM 310.

In one embodiment, at RECEIVE QUERY DATA FROM THE CURRENT USER CORRESPONDING TO A REQUEST FOR ASSISTANCE RELATED TO THE DATA MANAGEMENT SYSTEM 310, query data is received from the current user corresponding to a request for assistance related to the data management system, using any of the methods, processes, and procedures discussed above with respect to FIGS. 1-2.

In one embodiment, once query data is received from the current user corresponding to a request for assistance related to the data management system at RECEIVE QUERY DATA FROM THE CURRENT USER CORRESPONDING TO A REQUEST FOR ASSISTANCE RELATED TO THE DATA MANAGEMENT SYSTEM 310, process flow proceeds to RETRIEVE USER ATTRIBUTES DATA INDICATING ATTRIBUTES OF THE CURRENT USER 312.

In one embodiment, at RETRIEVE USER ATTRIBUTES DATA INDICATING ATTRIBUTES OF THE CURRENT USER 312, user attributes data is retrieved indicating attributes of the current user, using any of the methods, processes, and procedures discussed above with respect to FIGS. 1-2.

In one embodiment, once user attributes data is retrieved indicating attributes of the current user at RETRIEVE USER ATTRIBUTES DATA INDICATING ATTRIBUTES OF THE CURRENT USER 312, process flow proceeds to ANALYZE, WITH THE ANALYSIS MODEL, THE QUERY DATA AND THE USER ATTRIBUTES DATA BASED ON THE SUPERVISED AND UNSUPERVISED MACHINE LEARNING PROCESSES 314.

In one embodiment, at ANALYZE, WITH THE ANALYSIS MODEL, THE QUERY DATA AND THE USER ATTRIBUTES DATA BASED ON THE SUPERVISED AND UNSUPERVISED MACHINE LEARNING PROCESSES 314 the user attributes data is analyzed, with the analysis model, based on the supervised and unsupervised machine learning processes, using any of the methods, processes, and procedures discussed above with respect to FIGS. 1-2.

In one embodiment, once the user attributes data is analyzed, with the analysis model, based on the supervised and unsupervised machine learning processes at ANALYZE, WITH THE ANALYSIS MODEL, THE QUERY DATA AND THE USER ATTRIBUTES DATA BASED ON THE SUPERVISED AND UNSUPERVISED MACHINE LEARNING PROCESSES 314, process flow proceeds to GENERATE RELEVANT ASSISTANCE TOPIC DATA IDENTIFYING ASSISTANCE TOPICS LIKELY TO BE RELEVANT TO THE CURRENT USER BASED ON THE ANALYSIS BY THE ANALYSIS MODEL 316.

In one embodiment, at GENERATE RELEVANT ASSISTANCE TOPIC DATA IDENTIFYING ASSISTANCE TOPICS LIKELY TO BE RELEVANT TO THE CURRENT USER BASED ON THE ANALYSIS BY THE ANALYSIS MODEL 316 relevant assistance topic data is generated identifying assistance topics likely to be relevant to the current user based on the analysis by the analysis model, using any of the methods, processes, and procedures discussed above with respect to FIGS. 1-2.

In one embodiment, once relevant assistance topic data is generated identifying assistance topics likely to be relevant to the current user based on the analysis by the analysis model at GENERATE RELEVANT ASSISTANCE TOPIC DATA IDENTIFYING ASSISTANCE TOPICS LIKELY TO BE RELEVANT TO THE CURRENT USER BASED ON THE ANALYSIS BY THE ANALYSIS MODEL 316, process flow proceeds to OUTPUT PERSONALIZED ASSISTANCE DATA TO THE CURRENT USER BASED ON THE RELEVANT ASSISTANCE TOPIC DATA 318.

In one embodiment, at OUTPUT PERSONALIZED ASSISTANCE DATA TO THE CURRENT USER BASED ON THE RELEVANT ASSISTANCE TOPIC DATA 318 personalized assistance data is output to the current user based on the relevant assistance topic data, using any of the methods, processes, and procedures discussed above with respect to FIGS. 1-2.

In one embodiment, once personalized assistance data is output to the current user based on the relevant assistance topic data at OUTPUT PERSONALIZED ASSISTANCE DATA TO THE CURRENT USER BASED ON THE RELEVANT ASSISTANCE TOPIC DATA 318, process flow proceeds to END 320.

In one embodiment, at END 320 the process for accurately identifying the needs of users of a data management system is exited to await new data and/or instructions.

Figure 4:
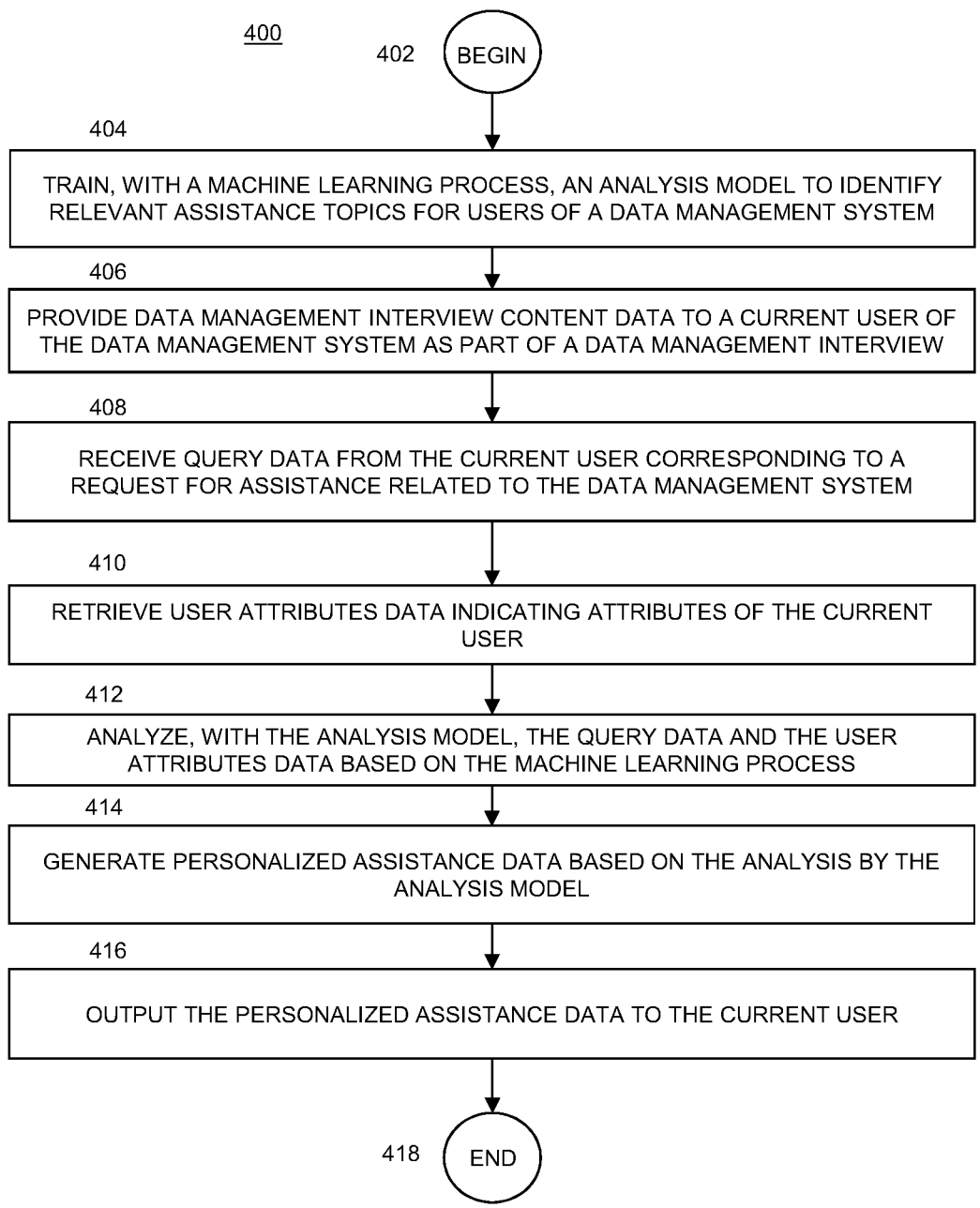
FIG. 4 is a flow diagram of a process for accurately identifying the needs of users of a data management system, in accordance with one embodiment.

FIG. 4 illustrates a flow diagram of a process 400 for accurately identifying the needs of users of a data management system, according to various embodiments.

Referring to FIG. 4, FIGS. 1-2, and the description of FIGS. 1-2 above, in one embodiment, process 400 begins at BEGIN 402 and process flow proceeds to TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 404.

In one embodiment, at TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 404, an analysis model is trained, with a machine learning process, to identify relevant assistance topics for users of a data management system, using any of the methods, processes, and procedures discussed above with respect to FIGS. 1-2.

In one embodiment, once an analysis model is trained, with a machine learning process, to identify relevant assistance topics for users of a data management system at TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 404 process flow proceeds to PROVIDE DATA MANAGEMENT INTERVIEW CONTENT DATA TO A CURRENT USER OF THE DATA MANAGEMENT SYSTEM AS PART OF A DATA MANAGEMENT INTERVIEW 406.

In one embodiment, at PROVIDE DATA MANAGEMENT INTERVIEW CONTENT DATA TO A CURRENT USER OF THE DATA MANAGEMENT SYSTEM AS PART OF A DATA MANAGEMENT INTERVIEW 406, data management interview content data is provided to a current user of the data management system as part of a data management interview, using any of the methods, processes, and procedures discussed above with respect to FIGS. 1-2.

In one embodiment, once data management interview content data is provided to a current user of the data management system as part of a data management interview at PROVIDE DATA MANAGEMENT INTERVIEW CONTENT DATA TO A CURRENT USER OF THE DATA MANAGEMENT SYSTEM AS PART OF A DATA MANAGEMENT INTERVIEW 406, process flow proceeds to RECEIVE QUERY DATA FROM THE CURRENT USER CORRESPONDING TO A REQUEST FOR ASSISTANCE RELATED TO THE DATA MANAGEMENT SYSTEM 408.

In one embodiment, at RECEIVE QUERY DATA FROM THE CURRENT USER CORRESPONDING TO A REQUEST FOR ASSISTANCE RELATED TO THE DATA MANAGEMENT SYSTEM 408, query data is received from the current user corresponding to a request for assistance related to the data management system, using any of the methods, processes, and procedures discussed above with respect to FIGS. 1-2.

In one embodiment, once query data is received from the current user corresponding to a request for assistance related to the data management system at RECEIVE QUERY DATA FROM THE CURRENT USER CORRESPONDING TO A REQUEST FOR ASSISTANCE RELATED TO THE DATA MANAGEMENT SYSTEM 408, process flow proceeds to RETRIEVE USER ATTRIBUTES DATA INDICATING ATTRIBUTES OF THE CURRENT USER 410.

In one embodiment, at RETRIEVE USER ATTRIBUTES DATA INDICATING ATTRIBUTES OF THE CURRENT USER 410, user product user attributes data is retrieved indicating attributes of the current user, using any of the methods, processes, and procedures discussed above with respect to FIGS. 1-2.

In one embodiment, once user attributes data is retrieved indicating attributes of the current user at RETRIEVE USER ATTRIBUTES DATA INDICATING ATTRIBUTES OF THE CURRENT USER 410, process flow proceeds to ANALYZE, WITH THE ANALYSIS MODEL, THE QUERY DATA AND THE USER ATTRIBUTES DATA BASED ON THE MACHINE LEARNING PROCESS 412.

In one embodiment, at ANALYZE, WITH THE ANALYSIS MODEL, THE QUERY DATA AND THE USER ATTRIBUTES DATA BASED ON THE MACHINE LEARNING PROCESS 412, the query data is analyzed, with the analysis model, and the user attributes data based on the machine learning process, using any of the methods, processes, and procedures discussed above with respect to FIGS. 1-2.

In one embodiment, once the query data is analyzed, with the analysis model, and the user attributes data based on the machine learning process at ANALYZE, WITH THE ANALYSIS MODEL, THE QUERY DATA AND THE USER ATTRIBUTES DATA BASED ON THE MACHINE LEARNING PROCESS 412, process flow proceeds to GENERATE PERSONALIZED ASSISTANCE DATA BASED ON THE ANALYSIS BY THE ANALYSIS MODEL 414.

In one embodiment, at GENERATE PERSONALIZED ASSISTANCE DATA BASED ON THE ANALYSIS BY THE ANALYSIS MODEL 414, personalized assistance data is generated based on the analysis by the analysis model, using any of the methods, processes, and procedures discussed above with respect to FIGS. 1-2.

In one embodiment, once personalized assistance data is generated based on the analysis by the analysis model at GENERATE PERSONALIZED ASSISTANCE DATA BASED ON THE ANALYSIS BY THE ANALYSIS MODEL 414, process flow proceeds to OUTPUT THE PERSONALIZED ASSISTANCE DATA TO THE CURRENT USER 416.

In one embodiment, at OUTPUT THE PERSONALIZED ASSISTANCE DATA TO THE CURRENT USER 416, the personalized assistance data is output to the current user, using any of the methods, processes, and procedures discussed above with respect to FIGS. 1-2.

In one embodiment, once the personalized assistance data is output to the current user at OUTPUT THE PERSONALIZED ASSISTANCE DATA TO THE CURRENT USER 416, process flow proceeds to END 418.

In one embodiment, at END 418 the process for accurately identifying the needs of users of a data management system is exited to await new data and/or instructions.

As noted above, the specific illustrative examples discussed above are but illustrative examples of implementations of embodiments of the method or process for accurately identifying the needs of users of a data management system. Those of skill in the art will readily recognize that other implementations and embodiments are possible. Therefore, the discussion above should not be construed as a limitation on the claims provided below.

In one embodiment, a computing system implemented method accurately identifies the needs of users of a data management system and provides personalized assistance to the users. The method includes training, with a machine learning process, an analysis model to identify relevant assistance topics for users of a data management system and providing data management interview content data to a current user of the data management system as part of a data management interview. The method includes receiving query data from the current user corresponding to a request for assistance related to the data management system, retrieving user attributes data indicating attributes of the current user, and analyzing, with the analysis model, the query data and the user attributes data based on the machine learning process. The method includes generating personalized assistance data based on the analysis by the analysis model and outputting the personalized assistance data to the current user.

In one embodiment, a computing system implemented method accurately identifies the needs of users of a data management system and provides personalized assistance to the users. The method includes training, with a supervised machine learning process, an analysis model to identify relevant assistance topics for users of a data management system and training, with an unsupervised machine learning process, the analysis model to identify relevant assistance topics for users of a data management system. The method includes providing data management interview content data to a current user of the data management system as part of a data management interview and receiving query data from the current user corresponding to a request for assistance related to the data management system. The method includes retrieving user attributes data indicating attributes of the current user and analyzing, with the analysis model, the query data and the user attributes data based on the supervised and unsupervised machine learning processes. The method includes generating relevant assistance topic data identifying assistance topics likely to be relevant to the current user based on the analysis by the analysis model and outputting personalized assistance data to the current user based on the relevant assistance topic data.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes training, with a machine learning process, an analysis model to identify relevant assistance topics for users of a data management system and providing data management interview content data to a current user of the data management system as part of a data management interview. The process includes receiving query data from the current user corresponding to a request for assistance related to the data management system, retrieving user attributes data indicating attributes of the current user, and analyzing, with the analysis model, the query data and the user attributes data based on the machine learning process. The process includes generating personalized assistance data based on the analysis by the analysis model and outputting the personalized assistance data to the current user.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes training, with a supervised machine learning process, an analysis model to identify relevant assistance topics for users of a data management system and training, with an unsupervised machine learning process, the analysis model to identify relevant assistance topics for users of a data management system. The process includes providing data management interview content data to a current user of the data management system as part of a data management interview and receiving query data from the current user corresponding to a request for assistance related to the data management system. The process includes retrieving user attributes data indicating attributes of the current user and analyzing, with the analysis model, the query data and the user attributes data based on the supervised and unsupervised machine learning processes. The process includes generating relevant assistance topic data identifying assistance topics likely to be relevant to the current user based on the analysis by the analysis model and outputting personalized assistance data to the current user based on the relevant assistance topic data.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term query includes, but is not limited to a textual query provided by a user to a data management system and an audible spoken query provided by a user to a data management system. As used herein, the term query data includes, but is not limited to the data representing a textual query or an audible spoken query.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
    training, with a supervised machine learning process, a first sub-model of an analysis model to identify relevant assistance topics for users of a tax return preparation system;
    training, with an unsupervised machine learning process, a second sub-model of the analysis model to identify relevant assistance topics for the users of the tax return preparation system;

training, with an unsupervised deep learning machine learning process, a third sub-model of the analysis model to identify relevant assistance topics for the users of the tax return preparation system;

providing tax return preparation interview content to a current user of the tax return preparation system as part of a tax return preparation interview;

receiving a query from the current user corresponding to a request for assistance related to the tax return preparation system, wherein the query includes a query provided to a conversational interface of the tax return preparation system;

retrieving attributes of the current user including at least user profile data indicating one or more groups of historical users of the tax return preparation system that are similar to the current user, and tax related data of the current user;

analyzing, with the first sub-model of the analysis model, the query and the attributes based on the supervised machine learning process by using a multiclass classifier that identifies one or more assistance topics relevant to the current user based on the query and the attributes;

analyzing, with the second sub-model of the analysis model, the query and the attributes based on the unsupervised machine learning process by:
  generating a first augmented query by combining additional query terms based on the attributes with the query; and
  identifying assistance topics associated with the first augmented query by using a Latent Dirichlet Allocation process;

analyzing, with the third sub-model of the analysis model, the query and the attributes based on the unsupervised deep learning machine learning process, by:
  generating a second augmented query by combining the additional query terms based on the attributes with text of the query;
  generating vectorization data by converting each term from the second augmented query to a numerical vector; and
  identifying assistance topics associated with the second augmented query by applying a grouping algorithm to the vectorization data;

generating personalized assistance data based on the analyses by the first, second, and third sub-models, and by:
  selecting a search engine from a plurality of search engines based on the assistance topics; and
  searching, with the selected search engine, among a database of assistance documents based on the assistance topics; and outputting the personalized assistance data to the current user based on the assistance topics.

2. The method of claim 1, wherein the attributes further include one or more of clickstream data indicating tax return preparation screens that have been visited by the current user in the tax return preparation interview, demographics data associated with the current user, or tax return preparation data received from the current user in association with the tax return preparation interview.

3. The method of claim 1, wherein generating the vectorization data includes applying one or more of a word2vec process, a doc2vec process, or a sentence2vec process.

4. The method of claim 1, wherein the grouping algorithm includes a K nearest neighbors clustering algorithm.

5. The method of claim 1, wherein the supervised machine learning process includes training the first sub-model with training set data including attributes of the historical users and how the historical users selected assistance documents from search results.

6. A system comprising:
at least one processor; and
at least one memory storing instructions that, when executed by the at least one processor, cause the system to:

train, with a supervised machine learning process, a first sub-model of an analysis model to identify relevant assistance topics for users of a tax return preparation system;

train, with an unsupervised machine learning process, a second sub-model of the analysis model to identify relevant assistance topics for the users of the tax return preparation system;

train, with an unsupervised deep learning machine learning process, a third sub-model of the analysis model to identify relevant assistance topics for the users of the tax return preparation system;

provide tax return preparation interview content to a current user of the tax return preparation system as part of a tax return preparation interview;

receive a query from the current user corresponding to a request for assistance related to the tax return preparation system, wherein the query includes a query provided to a conversational interface of the tax return preparation system;

retrieve attributes of the current user including at least user profile data indicating one or more groups of historical users of the tax return preparation system that are similar to the current user, and tax related data of the current user;

analyze, with the first sub-model of the analysis model, the query and the attributes based on the supervised machine learning process by using a multiclass classifier that identifies one or more assistance topics relevant to the current user based on the query and the attributes;

analyze, with the second sub-model of the analysis model, the query and the attributes based on the unsupervised machine learning process by:
  generating a first augmented query by combining additional query terms based on the attributes with the query; and
  identifying assistance topics associated with the first augmented query by using a Latent Dirichlet Allocation process;

analyze, with the third sub-model of the analysis model, the query and the attributes based on the unsupervised deep learning machine learning process, by:
  generating a second augmented query by combining the additional query terms based on the attributes with text of the query;
  generating vectorization data by converting each term from the second augmented query to a numerical vector; and
  identifying assistance topics associated with the second augmented query by applying a grouping algorithm to the vectorization data;

generate personalized assistance data based on the analyses by the first second, and third sub-models, and by:
  selecting a search engine from a plurality of search engines based on the assistance topics; and searching, with the selected search engine, among a database of assistance documents based on the assistance topics; and output the personalized assistance data to the current user based on the assistance topics.

7. The system of claim 6, wherein the attributes further include one or more of clickstream data indicating tax return preparation screens that have been visited by the current user in the tax return preparation interview, demographics data associated with the current user, or tax return preparation data received from the current user in association with the tax return preparation interview.

8. The system of claim 6, wherein generating the personalized assistance data includes:

selecting, from a plurality of conversational interface agents, a conversational interface agent to respond to the query via the conversational interface based on the analyses by the first, second, and third sub-models; and formulating a reply to the query with the selected conversational interface agent.

9. The system of claim 8, wherein outputting the personalized assistance data to the current user includes outputting the reply with the selected conversational interface agent.

10. The system of claim 9, wherein outputting the personalized assistance data includes outputting a natural language sentence in conversation with the current user.

11. The system of claim 10, wherein the natural language sentence is an audible sentence.

12. The system of claim 11, wherein the natural language sentence is a text sentence.

\* \* \* \* \*